INVENTOR
Christopher E. G. Bailey
BY
Ralph B. Stewart
ATTORNEY

United States Patent Office 3,021,071
Patented Feb. 13, 1962

3,021,071
SERVO SYSTEMS
Christopher E. G. Bailey, London, England, assignor to The Solartron Electronic Group Limited, Thames Ditton, Surrey, England
Filed Oct. 25, 1956, Ser. No. 618,291
Claims priority, application Great Britain Nov. 9, 1955
4 Claims. (Cl. 235—180)

The present invention relates to servo systems adapted to solve simultaneous equations.

The invention makes use of what are known as closed-loop servo systems, that is to say systems in which an input variation applied to the input of a servo gives rise to an output variation at the output of the servo, and in which a variation dependent upon the output variation is fed back to the input of the servo in such a manner as to reduce the difference between the input and output variations. Such systems therefore comprise a servo and a feedback path between the output and input of the servo. The servo may be of any kind, such as electro-mechanical or hydraulic for example.

In such a servo system it is normally desirable to arrange that the loop gain around the system, that is the gain around the loop including the servo and the feedback path, shall be a maximum consistent with stability.

It is known, for the purpose of solving simultaneous equations, to provide two or more closed-loop servo systems interconnected in such a way that the feedback variation of one system is a function of the output variation of the other system. The loop gain around the first-named system is then, over at least part of the range of variation, less or more than the safe maximum. If the first-named system be arranged to be stable throughout its range of operation, the maximum departure from correspondence between the output and input variations of that system is greater than is desirable. This disadvantage has sometimes led to the abandonment of such interconnected systems even when otherwise they might have been desirable.

It is the object of the present invention to provide an interconnected system in which the disadvantage referred to is substantially avoided or at least markedly reduced.

According to the present invention there is provided a servo arrangement for the solution of simultaneous equations comprising at least two closed-loop servo systems each having an input at which variations representative of one of the equations can be applied, at least two outputs, and means for introducing into the loop of one system a control dependent upon variations in one or more of the other systems and such as to render the loop gain around the first-named system more nearly constant than in the absence of the said control.

Figure 1:
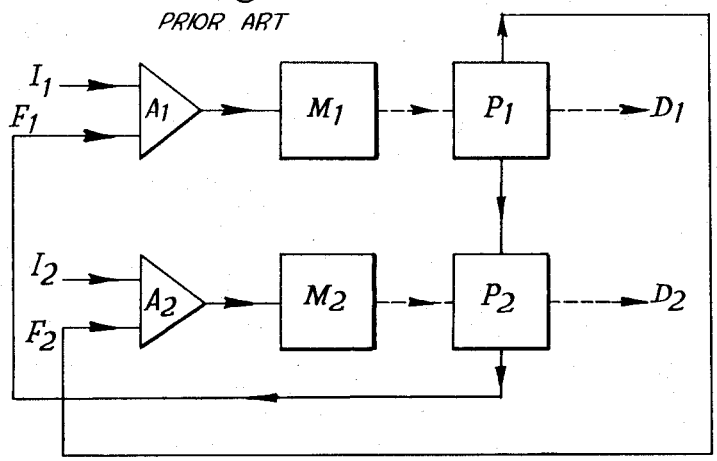
Figure 2:
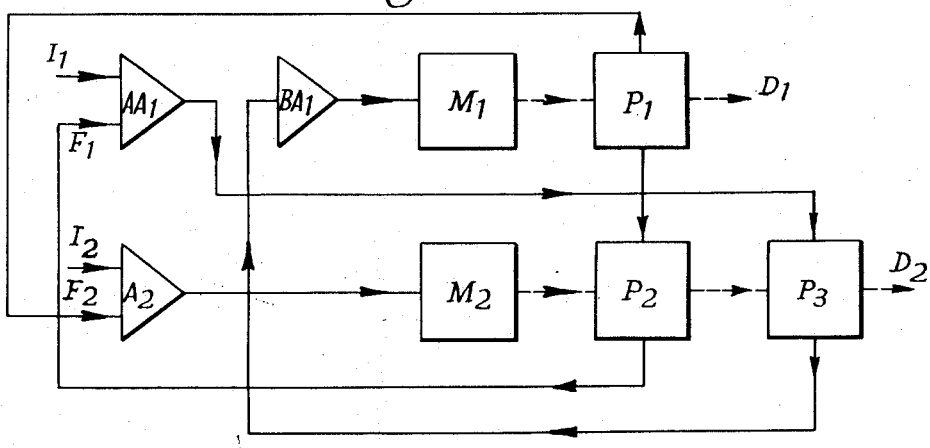
Figure 3:
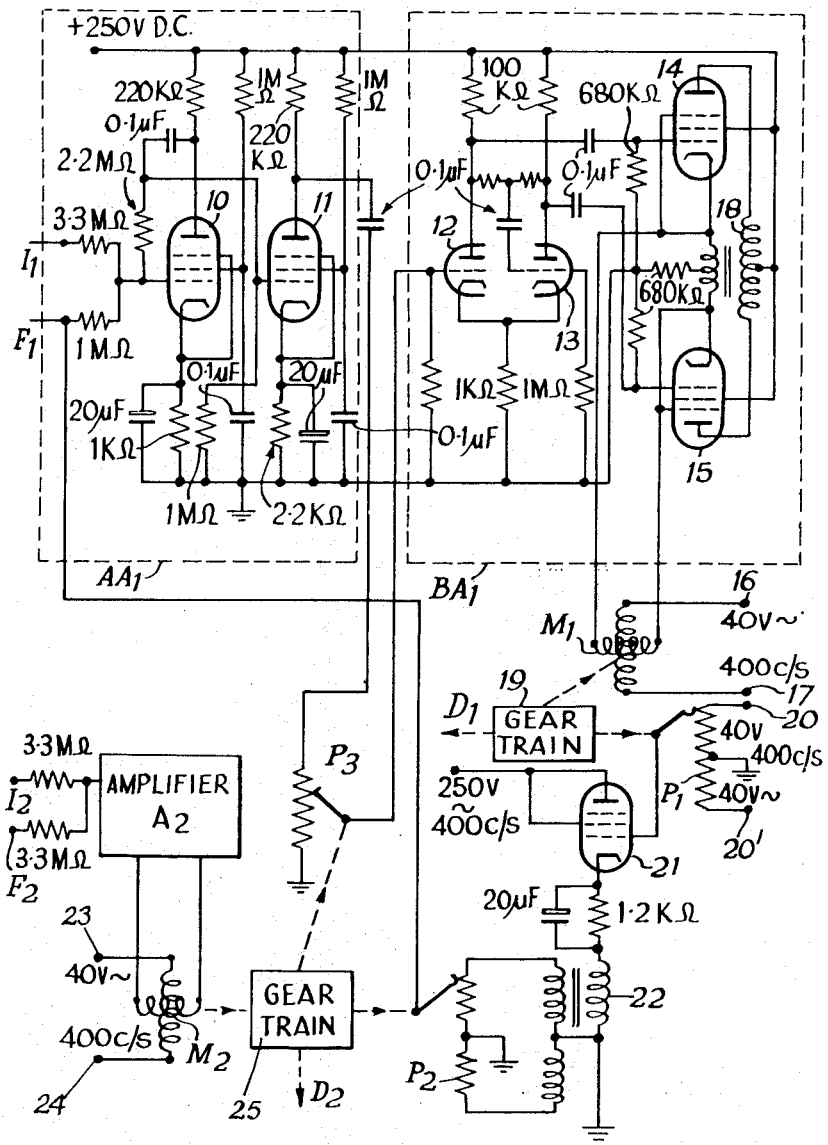

The invention will be described by way of example with reference to the accompanying drawings in which:

FIG. 1 is a block circuit diagram of a known arrangement embodying two closed-loop electro-mechanical servo systems, FIG. 2 is a modification of the arrangement of FIG. 1 in accordance with the present invention, and FIG. 3 is a practical circuit diagram of the circuit of FIG. 2.

In the drawings electrical couplings are indicated by full lines and mechanical couplings by broken lines.

In the known arrangement of FIG. 1 one electrical variation $I_1$ is applied to the input of a first servo comprising an amplifier $A_1$ and an electro-mechanical transducer in the form of a motor $M_1$ driving a potentiometer $P_1$ and an output shaft $D_1$ constituting the output of the first servo. Another electrical variation $I_2$ is applied to the input of a second servo comprising an amplifier $A_2$ and an electro-mechanical transducer in the form of a motor $M_2$ driving a potentiometer $P_2$ and an output shaft $D_2$ constituting the output of the second servo. A feedback loop is shown applying an electrical variation $F_1$ from the potentiometer $P_2$ to the input of the amplifier $A_1$. The voltage across the terminals of the potentiometer $P_2$ is derived from the wiper of the potentiometer $P_1$ and the voltage $F_1$ is, therefore, dependent upon the product of the positions of the shafts $D_1$ and $D_2$. A feedback voltage $F_2$ applied to the input of the amplifier $A_2$ may be derived from any suitable point according to circumstances, as shown, for instance from the potentiometer $P_1$.

The loop gain of the system $A_1M_1P_1P_2$ depends upon the position of the shaft $D_2$ and if this system is to be stable over the whole range of operation, the correspondence between $I_1$ and the movements of the shaft $D_1$ must be less accurate than would be desirable.

FIG. 2 differs from FIG. 1 in that the amplifier $A_1$ of FIG. 1, assumed to be a multi-stage amplifier, is shown divided into two parts $AA_1$ and $BA_1$. The voltage applied from the output of $AA_1$ to the input of $BA_1$ is controlled by a further potentiometer $P_3$ on the shaft $D_2$ and the potentiometer $P_3$ is arranged to have an operating law that is as nearly as is practically convenient the inverse of that of the potentiometer $P_2$. It is, of course, not essential that the two laws should be the exact inverse of one another and indeed it may be impossible to make them so. In one example the potentiometer $P_2$ is the sine winding of a sine-cosine potentiometer and the ideal law for the potentiometer $P_3$ is then a cosecant which tends to infinity at 0°. Any approximation to a cosecant law will give an improvement in comparison with the arrangement of FIG. 1.

The potentiometers $P_1$, $P_2$ and $P_3$ can be regarded as voltage generators or electro-mechanical transducers each generating a voltage dependent upon the movements of the mechanically driven member coupled thereto.

Referring now to FIG. 3, the amplifier within the broken line rectangle $AA_1$ comprises two amplifying stages 10 and 11 and is connected through a potentiometer $P_3$ to two valves 12 and 13 connected as a phase splitter. The output of 12, 13 is applied to two valves 14 and 15 in push-pull arranged to feed one phase of a two-phase motor $M_1$, the other phase of the motor being fed with an alternating current at 400 c./s. from a source connected to terminals 16 and 17.

The valves 14, 15 are provided with negative feedback through a transformer 18 in order to provide the damping requisite in view of the high inductance of the winding of the motor $M_1$ to which the valves are connected.

The motor $M_1$ is shown as driving the wiper of a potentiometer $P_1$ through a gear train 19 which also has an output shaft $D_1$. The potentiometer $P_1$ is centre-tapped to earth and each of its end terminals 20, 20' is connected to an alternating current source at 400 c./s.

The wiper of the potentiometer $P_1$ is coupled through a cathode follower valve 21 and a transformer 22 to the terminals of a potentiometer $P_2$ which is also centre-tapped to earth. The valve 21 is provided in order to prevent the current in $P_2$ from loading $P_1$ and thereby influencing its law.

The amplifier $A_2$ may be identical with $AA_1$ and $BA_1$ with the exception that the valve 11 is coupled to the valve 12 without the intermediary of the potentiometer $P_3$. One phase of the two-phase motor $M_2$ is connected to the output of the amplifier $A_2$, the other phase of the motor being fed with alternating current at 400 c./s. from terminals 23, 24 connected to a suitable source.

The motor $M_2$ drives a gear train 25 having one output shaft $D_2$, another driving the wiper of the potentiometer $P_2$ and a third driving the wiper of the potentiometer $P_3$.

The wiper of the potentiometer $P_2$ is connected to provide the input $F_1$.

In the example shown in FIG. 3 the input variations $I_1$ and $I_2$ are alternating currents at 400 c./s. varying in amplitude in accordance with some control parameter. The amplifier $AA_1$, $BA_1$ is therefore A.C.-coupled. The variations $I_1$ and $I_2$ may, however, be varying direct currents, in which case a D.C.-coupled amplifier is used and the motors $M_1$ and $M_2$ are replaced by D.C. motors.

If desired, the amplifier $A_2$ may be divided into two parts, corresponding to $AA_1$ and $BA_1$ and the voltage applied from the first part $AA_1$ to the second part $BA_1$ may be controlled by a potentiometer corresponding to $P_3$ driven by the shaft $D_1$ and having a law which is an approximate inverse of that of the potentiometer $P_1$. It will also be evident that the invention can be applied when there are more than two interconnected servo systems.

The way in which the invention can be applied to closed-loop servo systems other than electro-mechanical systems, for example to hydraulic systems, will be understood by those skilled in the art.

I claim:

1. An electro-mechanical servo arrangement comprising a first servo system including first and second amplifier portions each having an input and an output, a first electro-mechanical transducer electrically coupled to the output of said second amplifier portion, a second electro-mechanical transducer mechanically coupled to said first transducer, a second servo system including a third amplifier portion, a third electro-mechanical transducer electrically coupled to the output of said third amplifier portion, a fourth and a fifth electro-mechanical transducer mechanically coupled to said third transducer, means electrically connecting said fourth transducer to the input of said first amplifier portion and means electrically connecting said fifth transducer between the output of said first amplifier portion and the input of said second amplifier portion.

2. An arrangement according to claim 1, comprising means electrically coupling said second transducer to the input of said third amplifier portion.

3. An electro-mechanical servo arrangement comprising a first servo system including first and second amplifier portions each having an input and an output, a first electro-mechanical transducer electrically coupled to the output of said second amplifier portion, a first potentiometer, means mechanically coupling said transducer to said potentiometer, a second servo system including a third amplifier portion, a second electro-mechanical transducer electrically coupled to the output of said third amplifier portion, second and third potentiometers, means mechanically coupling said second transducer to said second and third potentiometers, means electrically connecting said second potentiometer to the input of said amplifier portion, and means electrically connecting said third potentiometer between the output of said first amplifier portion and the input of said second amplifier portion.

4. An arrangement according to claim 3, comprising means electrically coupling said first potentiometer to the input of said third amplifier portion.

References Cited in the file of this patent
UNITED STATES PATENTS 2,784,501 Stern et al. _____ Mar. 12, 1957

OTHER REFERENCES

Electronic Computers (Shannon), Electronics, August 1946, pp. 110–113.

An Automatic Simultaneous Equation Computer and its use in Solving Secular Equations (Adcock), The Review of Scientific Instruments, vol. 19, No. 3, March 1948, pp. 181–187.